US010587103B2

(12) United States Patent
Jarrett et al.

(10) Patent No.: US 10,587,103 B2
(45) Date of Patent: Mar. 10, 2020

(54) FLEXIBLE COUPLING FOR STANDPIPE ASSEMBLY

(71) Applicant: Bell Helicopter Textron Inc., Fort Worth, TX (US)

(72) Inventors: Chad Jarrett, Grand Prairie, TX (US); Andrew Paul Haldeman, Fort Worth, TX (US); Zachary Dailey, Grapevine, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 0 days.

(21) Appl. No.: 15/923,201

(22) Filed: Mar. 16, 2018

(65) Prior Publication Data
US 2019/0288493 A1    Sep. 19, 2019

(51) Int. Cl.
| | | |
|---|---|---|
| *H01R 39/00* | (2006.01) | |
| *H02G 3/04* | (2006.01) | |
| *B64C 27/14* | (2006.01) | |
| *H01R 39/08* | (2006.01) | |
| *H01R 39/34* | (2006.01) | |
| *F16D 3/72* | (2006.01) | |
| *B64C 27/32* | (2006.01) | |
| *F16D 3/52* | (2006.01) | |

(52) U.S. Cl.
CPC ........... *H02G 3/0481* (2013.01); *B64C 27/14* (2013.01); *B64C 27/32* (2013.01); *F16D 3/52* (2013.01); *F16D 3/72* (2013.01); *H01R 39/08* (2013.01); *H01R 39/34* (2013.01)

(58) Field of Classification Search
CPC ...... H02G 3/0481; H01R 39/34; H01R 39/08; H02K 16/00; B64G 1/286; G01C 19/42; B64C 27/10; B64C 27/18

USPC ........................................................... 439/13
See application file for complete search history.

(56) References Cited

U.S. PATENT DOCUMENTS

| | | | | |
|---|---|---|---|---|
| 2,731,278 A | * | 1/1956 | Soderstrom ............ | B64D 37/12 137/899.2 |
| 2,936,185 A | * | 5/1960 | Olsen ................... | F16L 27/0857 193/2 R |
| 3,444,744 A | * | 5/1969 | Lindberg ............... | G01C 19/42 74/5 R |
| 4,424,947 A | * | 1/1984 | Adams .................. | B64D 15/12 219/202 |
| 4,589,611 A | * | 5/1986 | Ramme .................. | B64C 27/10 244/12.3 |
| 5,167,582 A | | 12/1992 | Hunt | |
| 5,842,665 A | * | 12/1998 | McKinney .............. | B64C 27/18 244/2 |

(Continued)

FOREIGN PATENT DOCUMENTS

EP    2857313 A1    4/2015

OTHER PUBLICATIONS

Lambert, Brice; European Search Report for European Application No. 19155134; dated Aug. 21, 2019; 4 pages.

*Primary Examiner* — Jean F Duverne
(74) *Attorney, Agent, or Firm* — Winstead PC

(57) ABSTRACT

A standpipe assembly for a rotorcraft includes a slip ring positioned within the mast of the rotorcraft. The slip ring includes a stator rotationally connected to a rotor. A flexible coupling is connected to the stator and a standpipe tube is connected to the flexible coupling. The flexible coupling is capable of angular, axial, and torsional displacement.

20 Claims, 6 Drawing Sheets

(56) References Cited

U.S. PATENT DOCUMENTS

| | | | | |
|---|---|---|---|---|
| 8,120,228 B2* | 2/2012 | Carvalho | ............... | H01R 39/08 |
| | | | | 310/232 |
| 8,628,042 B2* | 1/2014 | Imbert | ................... | B64D 15/14 |
| | | | | 244/134 D |
| 8,757,536 B2* | 6/2014 | Tourn | ....................... | B64C 27/18 |
| | | | | 244/17.11 |
| 2009/0051159 A1* | 2/2009 | Cameron | ................ | F16L 41/14 |
| | | | | 285/5 |
| 2009/0235765 A1* | 9/2009 | Buchele | ................. | B64G 1/286 |
| | | | | 74/5.47 |
| 2009/0237038 A1* | 9/2009 | Heidebrink | ............ | H02K 16/00 |
| | | | | 322/28 |
| 2015/0303633 A1 | 10/2015 | Altieri et al. | | |

\* cited by examiner ered States Patent US 10,587,103 B2

FLEXIBLE COUPLING FOR STANDPIPE ASSEMBLY

STATEMENT REGARDING FEDERALLY SPONSORED RESEARCH OR DEVELOPMENT

This invention was made with government support under contract number N00019-11-G-003 D00029 awarded by the Naval Air Systems Command. The government has certain rights in the invention.

BACKGROUND

This section provides background information to facilitate a better understanding of the various aspects of the disclosure. It should be understood that the statements in this section of this document are to be read in this light, and not as admissions of prior art.

A rotorcraft or rotary-wing aircraft is a heavier-than-air flying machine that uses lift generated by rotor blades that revolve around a mast. Several rotor blades mounted on a single mast via a yoke or yokes is referred to as a rotor hub. A standpipe assembly attached to a gearbox and attached to the mast via a slip ring is used to channel wiring through the gearbox and the mast of the rotorcraft. The slip ring includes a rotor attached to the mast and a stator attached to the standpipe assembly. The slip ring transmits electrical power between the non-rotating components and the rotating components of the rotor hub. The standpipe assembly is subject to angular and axial displacement due to mast bending during operation of the rotorcraft. Standpipe assemblies typically incorporate a rigid coupling to connect the standpipe assembly to the slip ring.

During operation of the rotorcraft, thrust and moments of the rotor hub as well as thermal growth/shrinkage variations may cause the mast to deflect or bend. In rotorcraft applications where the slip ring is positioned above the yoke or yokes and not size constrained by the mast, the slip ring is robust enough to react the mast deflections. In recent rotorcraft applications where the slip ring is positioned within the mast and constrained by the size of the mast, mast deflections can induce high loads into the slip ring as the slip ring rotor wants to bend with the mast while the slip ring stator wants to remain stiff with the standpipe assembly. The bending movement of the rotor relative to the stator causes one to rub the other which may lead to chips and shavings of the slip ring breaking off and falling into the gearbox thus shortening the life of the slip ring and damaging the gearbox. The bending moment may also produce excessive reactive radial loads in the slip ring bearings which can lead to premature failure of the bearings.

SUMMARY

An example of a flexible coupling for a standpipe assembly of a rotorcraft includes an upper fitting unitarily formed with a localized area of flexibility and configured to connect to a slip ring, and a lower fitting unitarily formed with the localized area of flexibility and configured to connect to a standpipe.

An example of a standpipe assembly of a rotorcraft includes a slip ring including a stator rotationally connected to a rotor, configured to be positioned within a mast of the rotorcraft, a flexible coupling connected to the stator, and a standpipe tube connected to the flexible coupling.

An example of a standpipe assembly of a rotorcraft includes a slip ring connected to a flexible coupling, a standpipe tube connected to the flexible coupling, a first helical slot formed in the flexible coupling, a second helical slot formed in the flexible coupling parallel with the first helical slot, a first stop formed in the first helical slot, a second stop formed in the second helical slot, and wherein the flexible coupling is capable of angular, axial, and torsional displacement.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Figure 1:
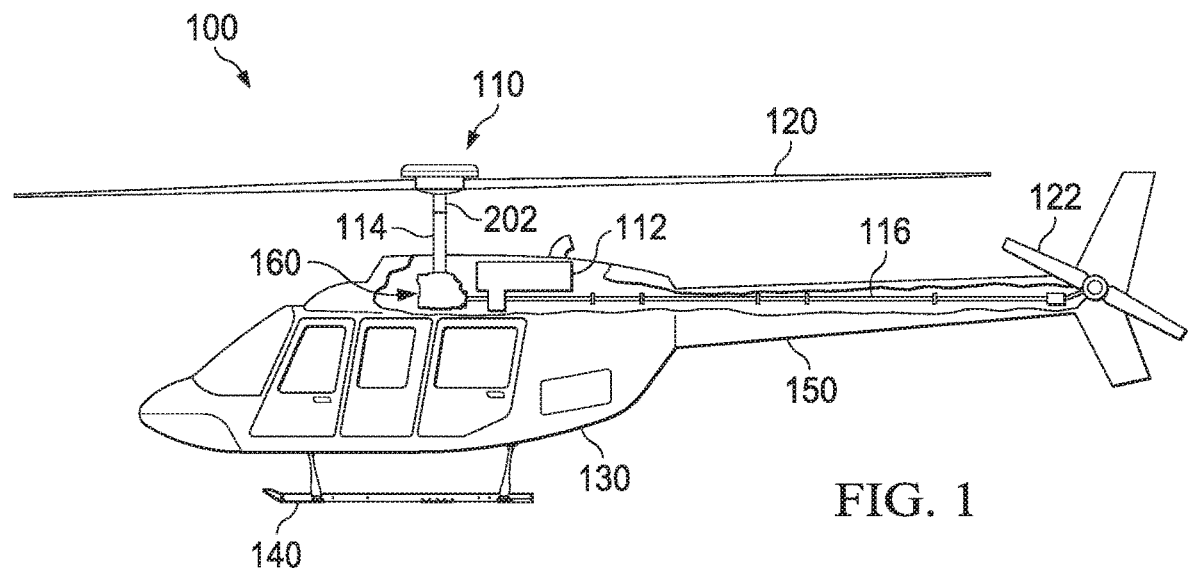
FIG. 1 is a perspective view of a rotorcraft implementing a flexible coupling in a standpipe assembly according to aspects of the disclosure.

It is to be understood that the following disclosure provides many different embodiments, or examples, for implementing different features of various embodiments. Specific examples of components and arrangements are described below to simplify the disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

FIG. 1 illustrates an example of rotorcraft 100 incorporating flexible coupling 202. Rotorcraft 100 includes power train system 110, rotor blades 120, tail rotor blades 122, fuselage 130, landing gear 140, and empennage/tailboom 150. Power train system 110 may rotate rotor blades 120 and tail rotor blades 122. Power train system 110 includes engine 112, gearbox 160, rotor mast 114, and tail rotor drive shaft 116. Engine 112 supplies torque to rotor mast 114 for rotating rotor blades 120. Engine 112 supplies torque to tail rotor drive shaft 116 for rotating tail rotor blades 122. Gearbox 160 may be a rotor transmission system. Power train system 110 may include more or different gearboxes 160. Flexible coupling 202 attaches a standpipe tube to a slip ring within rotor mast 114.

Fuselage 130 represents the body of rotorcraft 100 and may be coupled to power train system 110 such that power train system 110 and rotor blades 120 may move fuselage 130 through the air. Landing gear 140 supports rotorcraft 100 when rotorcraft 100 is landing or when rotorcraft 100 is at rest on the ground. Empennage/tailboom 150 represents the tail section of the aircraft and features tail rotor blades 122. Power train system 110 and tail rotor blades 122 may collectively provide thrust to counter the torque effect created by rotor blades 120.

Flexible coupling 202 is illustrated in the context of rotorcraft 100; however, it is understood by those skilled in the art that flexible coupling 202 can be implemented in a variety of ways on a variety of rotorcraft including, for example, tiltrotor aircraft, tiltwing aircraft, quad tiltrotor aircraft, unmanned aircraft and the like. As such, those skilled in the art will recognize that flexible coupling 202 can be integrated into a variety of rotorcraft configurations.

Figure 2:
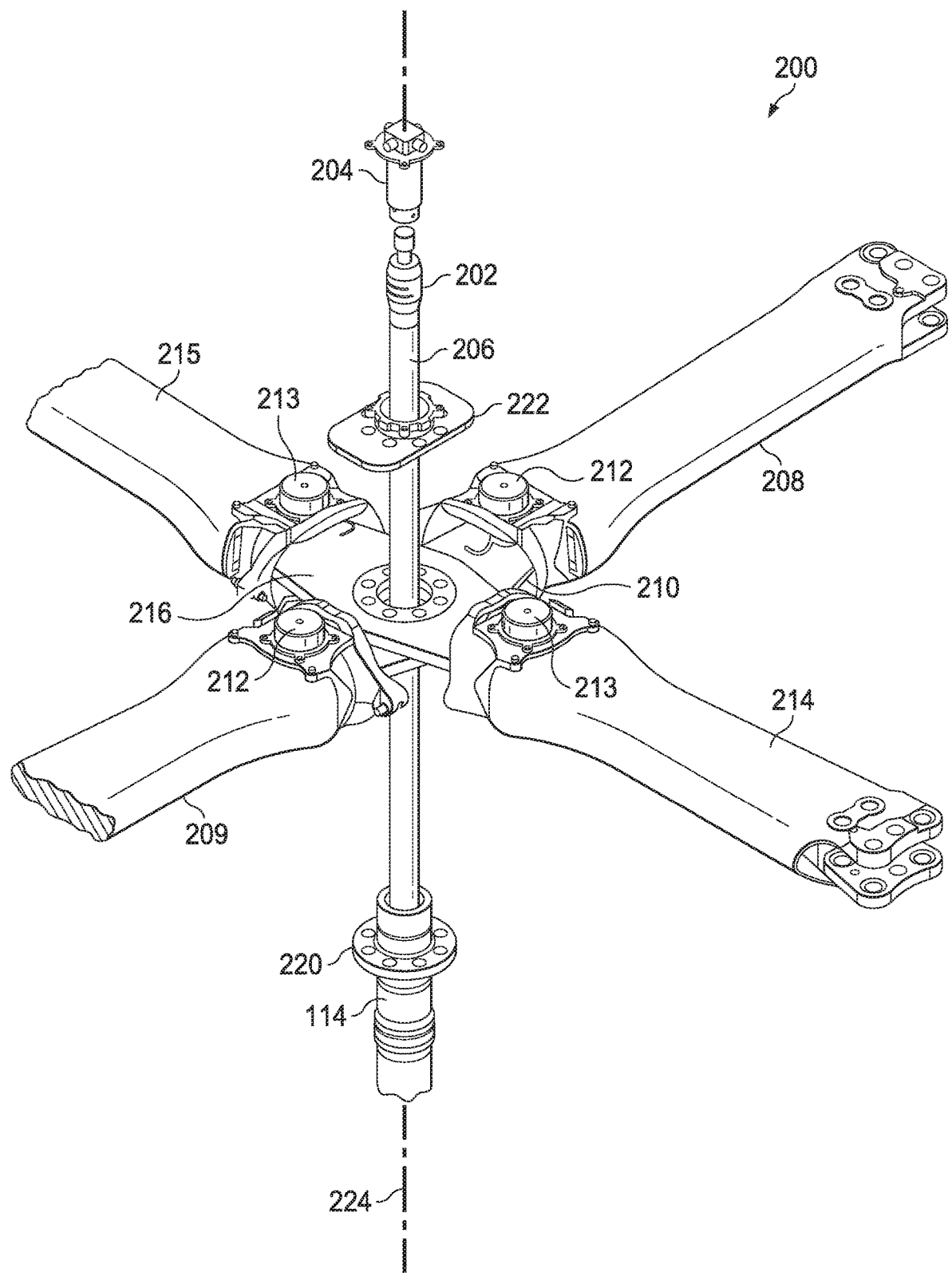
FIG. 2 is an exploded perspective view of a rotor hub according to one or more aspects of the disclosure.

Referring to FIG. 2, an exploded view of rotor hub 200 is shown. Rotor hub 200 includes flexible coupling 202 connected to slip ring 204. Standpipe tube 206 is connected to flexible coupling 202 on one end and is connected to the gearbox sump of gearbox 160 on the opposite end. Standpipe tube 206 is generally tubular and is of a predetermined length dictated by the specifications of gearbox 160. Slip ring 204 enables the transfer of electric power or signal circuits across a rotating surface, such as rotor mast 114. The electrical power may be used, for example, for satellite communication antennas, lights, actuators, etc. Cuffs 208, 209 are attached to lower yoke 210 via inboard bearing assemblies 212. Cuffs 214, 215 are attached to upper yoke 216 via inboard bearing assemblies 213. The cuffs are further attached to rotor blades. It is understood that the number of cuffs and respective rotor blades may be greater or fewer. Rotor mast 114 is generally a hollow cylinder connected to the gearbox of the rotorcraft. Rotor mast 114 includes mast flange 220. Lower yoke 210 and upper yoke 216 are stacked on mast flange 220. Mounting hardware attaches drive plate 222 to upper yoke 216, connects upper yoke 216 to lower yoke 210, and connects lower yoke to mast flange 220. Slip ring 204 is connected to drive plate 222. Rotor mast 114 rotates about longitudinal axis 224.

Figure 3:
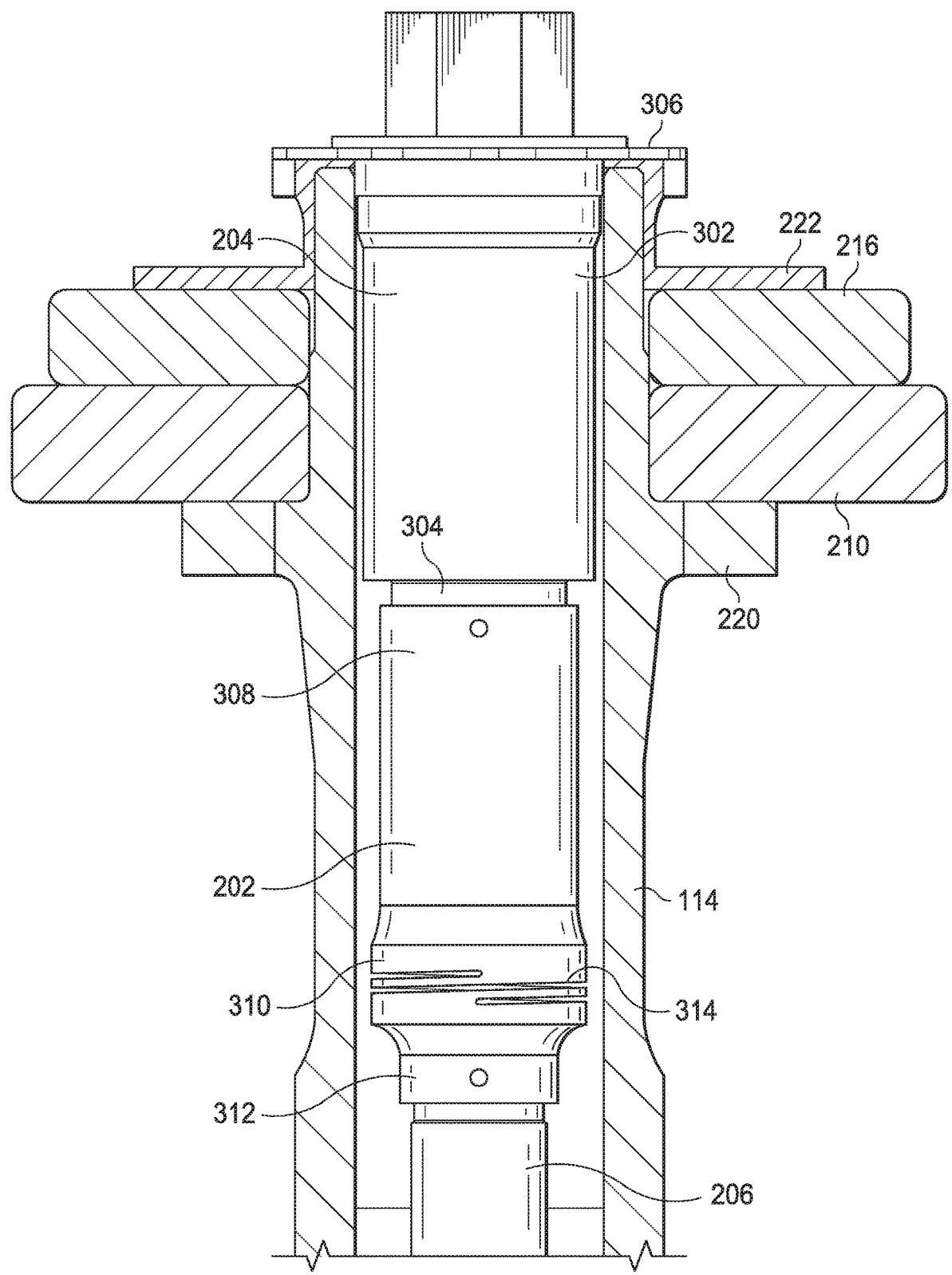
FIG. 3 is a partial cross-sectional view of a flexible coupling connected to a standpipe and a slip ring within a mast according to one or more aspects of the disclosure.

Referring to FIG. 3, flexible coupling 202, slip ring 204, and standpipe tube 206 are positioned within rotor mast 114. Slip ring 204 includes rotor 302, stator 304, and slip ring flange 306. Rotor 302 is connected to slip ring flange 306. Slip ring flange 306 is connected to drive plate 222. Rotor 302 rotates with rotor mast 114. Rotor 302 is free to rotate about axis 224 with respect to stator 304. The outer diameter of rotor 302 is limited by the inner diameter of rotor mast 114.

Flexible coupling 202 includes upper fitting 308, spring section 310, and lower fitting 312. Flexible coupling 202 is formed with upper fitting 308, spring section 310, and lower fitting 312 such that upper fitting 308, spring section 310, and lower fitting 312 are all unitary portions of flexible coupling 202.

Figure 6:
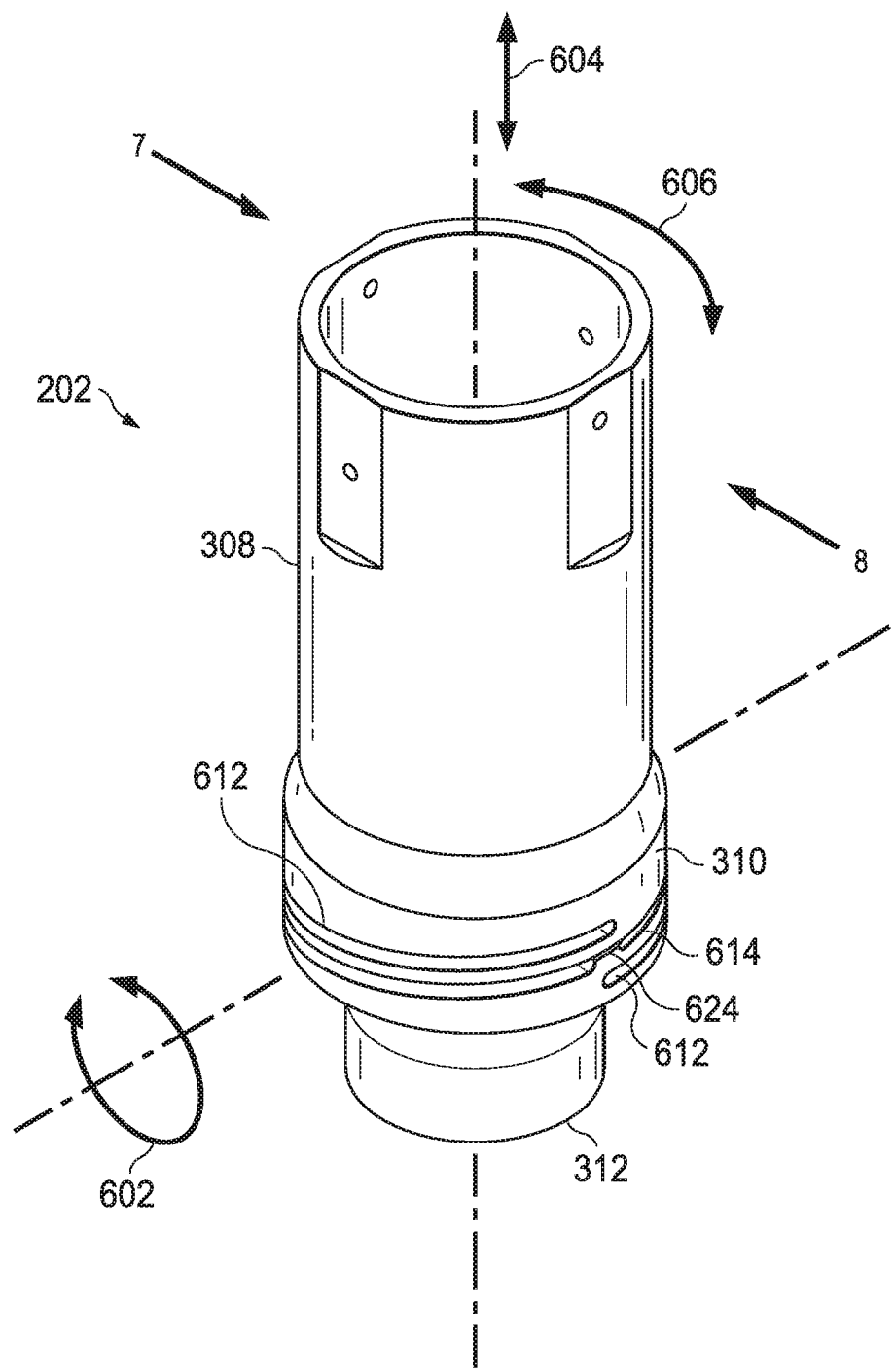
FIG. 6 is a perspective view of a flexible coupling according to one or more aspects of the disclosure.

Flexible coupling 202 is generally cylindrical. Stator 304 is connected to upper fitting 308. Standpipe tube 206 is connected to lower fitting 312. Spring section 310 is a localized area of flexibility designed to accommodate angular, axial, and torsional displacement due to rotor mast bending caused by thrust and moments of the rotor hub during operation of the rotorcraft. Spring section 310 is capable of displacement in angular direction 602 (FIG. 6), axial direction 604 (FIG. 6), and torsional direction 606 (FIG. 6). Spring section 310 includes slot 314. Slot 314 is a helical slot formed around spring section 310. The localized area of flexibility of spring section 310 is not limited to a helical slot. Spring section 310, for example, may include a bellows arrangement, a volute spring, a belleville spring, etc.

During operation, rotor mast 114, lower yoke 210, upper yoke 216, drive plate 222, slip ring flange 306 and rotor 302 all rotate together with respect to stator 304, flexible coupling 202, and standpipe tube 206.

Figure 5:
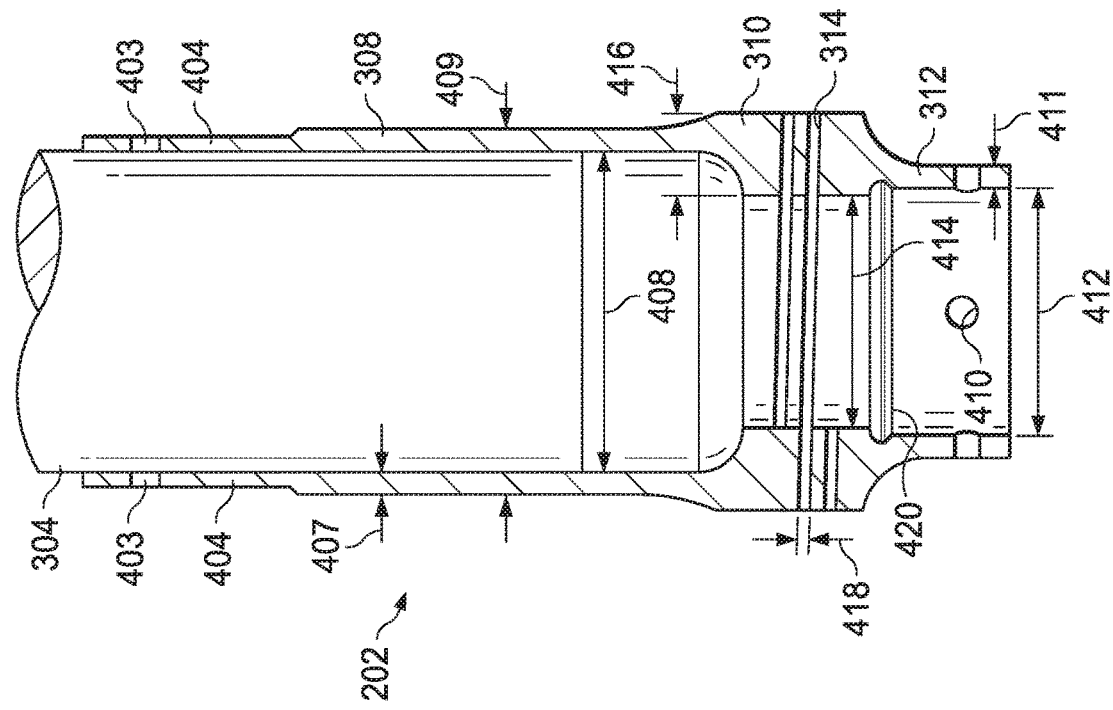
FIG. 5 is a cross-sectional view of a flexible coupling according to one or more aspects of the disclosure taken along line 5-5 of FIG. 4.
Figure 4:
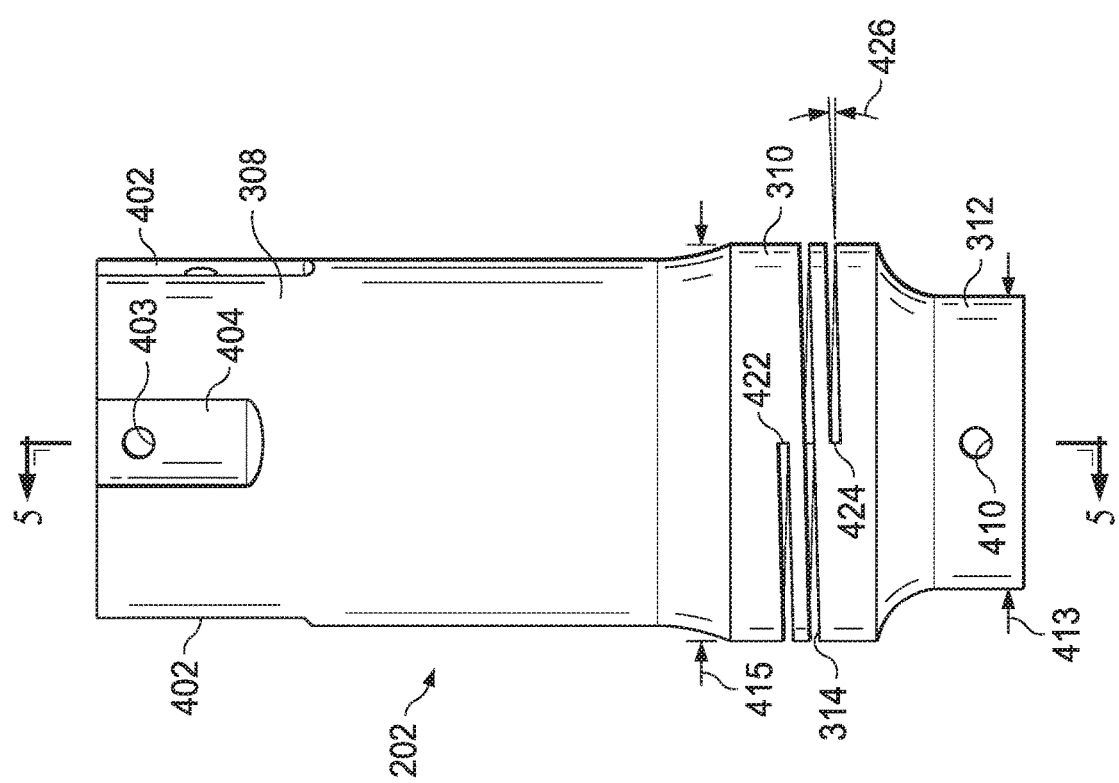
FIG. 4 is a side view of a flexible coupling according to one or more aspects of the disclosure.

FIGS. 4 and 5 illustrate flexible coupling 202 with spring section 310 including slot 314. Upper fitting 308 includes indentions 402 disposed on opposite sides of flexible coupling 202. Upper fitting 308 includes indentions 404 disposed on opposite sides of flexible coupling 202 positioned between indentions 402. Indentions 402, 404 provide a flat surface for bolt attachment. Indentions 402, 404 include mounting holes 403. Indentions 402, 404 and mounting holes 403 are used to secure stator 304 to upper fitting 308 of flexible coupling 202. Indentions 402, 404 are unevenly spaced relative to each other to provide an attachment position which controls the orientation of stator 304 relative to gearbox 160. Upper fitting 308 includes inner diameter 408 and outer diameter 409. Inner diameter 408 is sized to receive stator 304. Upper fitting 308 includes sidewall thickness 407. Lower fitting 312 includes mounting holes 410. Mounting holes 410 are used to secure lower fitting 312 of flexible coupling 202 to standpipe tube 206. Lower fitting 312 includes inner diameter 412 and outer diameter 413. Inner diameter 412 is sized to receive standpipe tube 206. Lower fitting 312 includes sidewall thickness 411.

Spring section 310 includes inner diameter 414 and outer diameter 415. Outer diameter 415 is greater than outer diameters 409, 413. Outer diameter 415 is limited by the inner diameter of rotor mast 114. Spring section 310 includes sidewall thickness 416. Sidewall thickness 416 is greater than sidewall thicknesses 407, 411. Slot 314 in spring section 310 includes thickness 418. Inner diameter 414 is less than interior diameter 412 which forms shoulder 420. Inner diameter 414 must be wide enough for electrical wiring extending from slip ring 204 to pass through flexible coupling 202 in order to connect to an electrical power source such as a battery of the engine or subsequent wiring harness.

Slot 314 extends between end 422 and end 424 in a helical pattern at angle 426 around spring section 310. Slot 314, for example, wraps around spring section 310 twice but may extend a fewer or greater number of wraps at a different angle and having a different thickness depending on desired spring rate. The spring rate of spring section 310 is application specific and is dictated by flight dynamics, loads, and geometry of the particular rotorcraft flexible coupling 202 is deployed in. The length of slot 314, the width of thickness 416, the width of thickness 418, and the angle of angle 426 all affect the spring rate of spring section 310.

Figure 7:
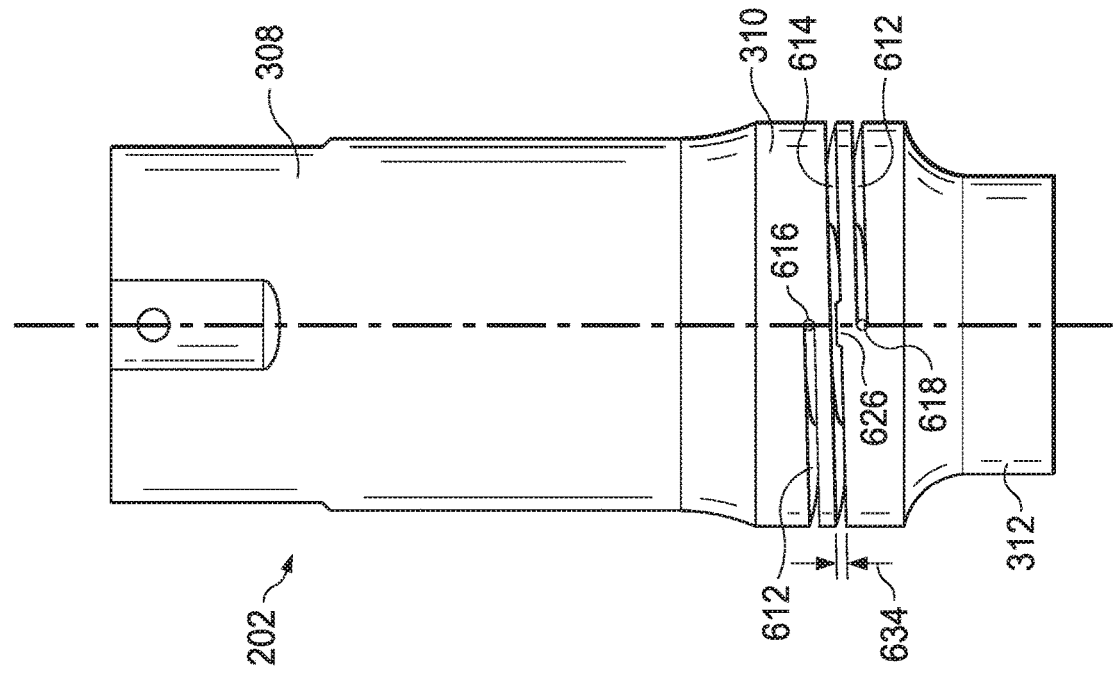
FIG. 7 is a side view of a flexible coupling according to one or more aspects of the disclosure taken from direction 7 of FIG. 6.
Figure 8:
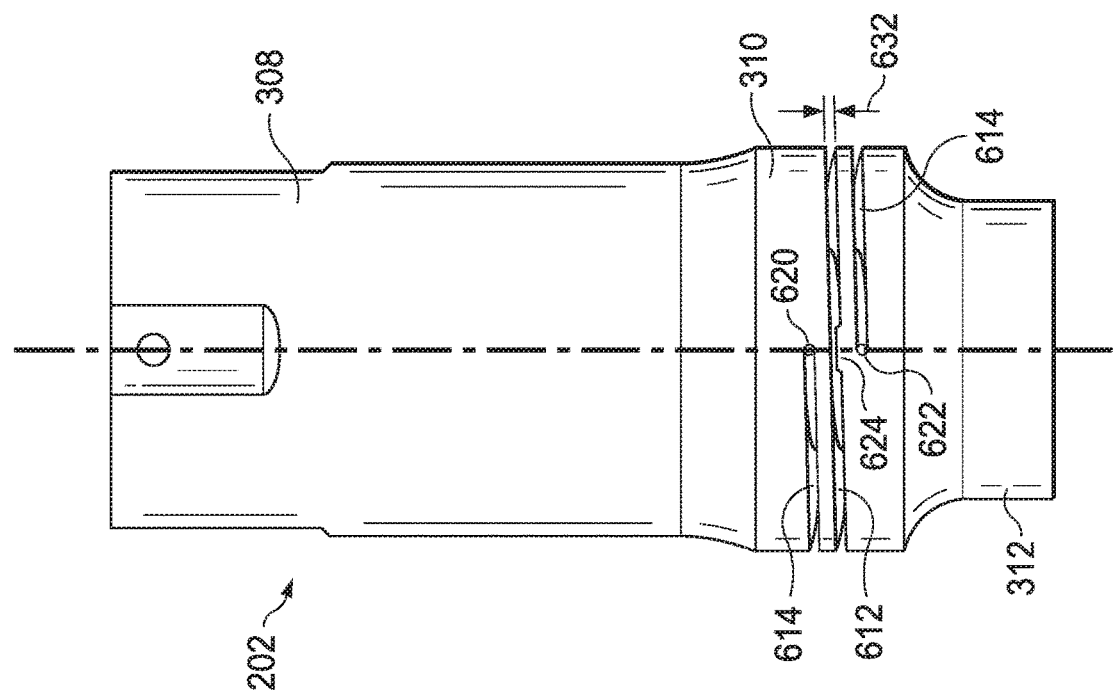
FIG. 8 is a side view of a flexible coupling according to one or more aspects of the disclosure taken from direction 8 of FIG. 6.

FIGS. 6-8 illustrate flexible coupling 202 with spring section 310 including slots 612 and 614. FIG. 7 shows flexible coupling 202 from direction 7 shown in FIG. 6. FIG. 8 shows flexible coupling 202 from direction 8 shown in FIG. 6.

Slots 612 and 614 are distinct, parallel slots that each extend at least once around spring section 310. Slots 612 and 614 do not intersect. Slot 612 extends between end 616 and end 618 in a helical pattern. Slot 612 has thickness 632. Slot 614 extends between end 620 and end 622 in a helical pattern. Slot 614 has thickness 634. Stop 624 interrupts slot 612 proximate the midpoint of slot 612. Stop 624 extends no more than half of thickness 632 into slot 612. Stop 626 interrupts slot 614 proximate the midpoint of slot 614. Stop 626 extends no more than half of thickness 634 into slot 614. Stops 624, 626 are equally spaced from each other around spring section 310. Ends 620, 622 are disposed longitudinally on opposite sides of slot 612 proximate stop 624. Ends 616, 618 are disposed longitudinally on opposite sides of slot 614 proximate stop 626.

During installation, slip ring 204 is bolted on to flexible coupling 202 and flexible coupling 202 is bolted on to standpipe tube 206 exterior to rotorcraft 100. The whole of the slip ring, flexible coupling, and standpipe pipe is lowered through the mast where slip ring flange 306 is bolted to drive plate 222 and standpipe tube 206 is attached to gearbox 160. The standpipe tube includes an O-ring which seals the standpipe tube against the gearbox. The O-ring creates a tight fit between the standpipe tube and the gearbox and substantial pressure may be required to move the standpipe tube through the gearbox during installation and during disassembly for maintenance purposes. Stops 624, 626 prevent over compression of spring section 310 during installation which could be damaging to flexible coupling 202. However, since the stops do not extend past half the thickness of their respective slots, stops 624, 626 do not impede the ability of spring section 310 to accommodate angular 602, axial 604, and torsional 606 displacement of flexible coupling 202 due to rotor mast deflections during operation.

The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," "generally," and "about" may be substituted with "within [a percentage] of" what is specified, as understood by a person of ordinary skill in the art.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A flexible coupling for a standpipe assembly of a rotorcraft, comprising:
   an upper fitting unitarily formed with a localized area of flexibility and configured to connect to a slip ring;
   a lower fitting unitarily formed with the localized area of flexibility and configured to connect to a standpipe;
   a first helical slot formed in the localized area of flexibility, the first helical slot including a first stop positioned midway between ends of the first helical slot; and
   a second helical slot formed in the localized area of flexibility.

2. The flexible coupling of claim 1, wherein a sidewall thickness of the localized area of flexibility is greater than a sidewall thickness of the upper fitting.

3. The flexible coupling of claim 1, wherein a sidewall thickness of the localized area of flexibility is greater than a sidewall thickness of the lower fitting.

4. The flexible coupling of claim 1, wherein the first helical slot is parallel with the second helical slot.

5. The flexible coupling of claim 1, wherein the second helical slot includes a second stop positioned midway between ends of the second helical slot.

6. The flexible coupling of claim 5, wherein the ends of the first helical slot are disposed longitudinally on opposite sides of the second helical slot and the ends of the second helical slot are disposed longitudinally on opposite sides of the first helical slot.

7. The flexible coupling of claim 1, wherein a sidewall thickness of the localized area of flexibility is greater than a sidewall thickness of the upper fitting; and
   the sidewall thickness of the localized area of flexibility is greater than a sidewall thickness of the lower fitting.

8. The flexible coupling of claim 5, wherein a sidewall thickness of the localized area of flexibility is greater than a sidewall thickness of the upper fitting; and
   the sidewall thickness of the localized area of flexibility is greater than a sidewall thickness of the lower fitting.

9. The flexible coupling of claim 5, further comprising:
   a first stop extending into the first helical slot no more than half a thickness of the first helical slot; and
   a second stop extending into the second helical slot no more than half a thickness of the second helical slot.

10. The flexible coupling of claim 9, wherein a sidewall thickness of the localized area of flexibility is greater than a sidewall thickness of the upper fitting; and
    the sidewall thickness of the localized area of flexibility is greater than a sidewall thickness of the lower fitting.

11. A standpipe assembly of a rotorcraft, comprising:
    a slip ring including a stator rotationally connected to a rotor, configured to be positioned within a mast of the rotorcraft;
    a flexible coupling connected to the stator;
    a standpipe tube connected to the flexible coupling;
    a first helical slot extending once around the flexible coupling from a first end to a second end; and
    a second helical slot extending once around the flexible coupling from a third end to a fourth end, wherein the first end is separated longitudinally from the second end by the second helical slot and the third end is separated longitudinally from the fourth end by the first helical slot.

12. The standpipe assembly of claim 11, wherein the flexible coupling is capable of angular, axial, and torsional displacement.

13. The standpipe assembly of claim 11, wherein the second helical slot is parallel with the first helical slot.

14. The standpipe assembly of claim 11, wherein the flexible coupling comprises:
   a first stop extending into the first helical slot no more than half a thickness of the first helical slot; and
   a second stop extending into the second helical slot no more than half a thickness of the second helical slot.

15. The standpipe assembly of claim 14, wherein the first helical slot extends from a first end to a second end and the first stop is positioned midway between the first end and the second end and the second helical slot extends from a third end to a fourth end and the second stop is positioned midway between the third end and the fourth end.

16. The standpipe assembly of claim 11, wherein the flexible coupling further comprises a first stop positioned between the first end and the second end of the first helical slot.

17. The standpipe assembly of claim 16, wherein the flexible coupling further comprises a second stop positioned between the third end and the fourth end of the first helical slot.

18. The standpipe assembly of claim 17, wherein the flexible coupling comprises an upper fitting coupled to the slip ring;
   a lower fitting coupled to the standpipe tube, wherein a sidewall thickness of the flexible coupling is greater than a thickness of the upper fitting and the sidewall thickness is greater than a thickness of the lower fitting.

19. A standpipe assembly of a rotorcraft, comprising:
   a slip ring connected to a flexible coupling;
   a standpipe tube connected to the flexible coupling;
   a first helical slot formed in the flexible coupling;
   a second helical slot formed in the flexible coupling parallel with the first helical slot;
   a first stop formed in the first helical slot;
   a second stop formed in the second helical slot; and
   wherein the flexible coupling is capable of angular, axial, and torsional displacement.

20. The standpipe assembly of claim 19, wherein ends of the first helical slot are disposed longitudinally on opposite sides of the second helical slot proximate the second stop and ends of the second helical slot are disposed longitudinally on opposite sides of the first helical slot proximate the first stop.

* * * * *